United States Patent [19]

Peterson

[11] Patent Number: 4,570,505
[45] Date of Patent: Feb. 18, 1986

[54] RACK LUBRICATOR

[75] Inventor: David A. Peterson, Milford, Ohio

[73] Assignee: Cincinnati Milacron Inc., Cincinnati, Ohio

[21] Appl. No.: 597,515

[22] Filed: Apr. 6, 1984

[51] Int. Cl.⁴ .................. F16H 57/04; F16H 1/04; F16N 7/12; F16N 7/24
[52] U.S. Cl. ...................... 74/467; 74/422; 74/468; 184/16; 184/17
[58] Field of Search .............. 184/16, 17, 19, 20, 184/23, 22; 74/467, 468, 422

[56] References Cited

U.S. PATENT DOCUMENTS

| | | | |
|---|---|---|---|
| 1,895,728 | 1/1933 | Pippin | 184/19 |
| 1,949,612 | 3/1934 | Mattair et al. | 184/19 |
| 2,308,872 | 1/1943 | Foster | 184/17 |
| 2,541,301 | 2/1951 | Sissler | 184/17 |
| 2,638,391 | 5/1953 | Heusser | 184/19 |
| 2,675,098 | 4/1954 | Cole | 74/467 |
| 2,704,465 | 2/1955 | Haller | 74/434 |
| 2,890,881 | 6/1959 | Tucker, Jr. | 74/422 |
| 3,220,276 | 11/1965 | Bruns | 74/422 |
| 3,769,850 | 11/1973 | Culligan | 74/422 |

FOREIGN PATENT DOCUMENTS

| | | | |
|---|---|---|---|
| 330252 | 5/1958 | Switzerland | 184/17 |
| 739967 | 11/1955 | United Kingdom | 184/16 |
| 924792 | 5/1963 | United Kingdom | 184/17 |

Primary Examiner—Lawrence J. Staab
Assistant Examiner—Michael D. Bednarek
Attorney, Agent, or Firm—Thomas M. Farrell

[57] ABSTRACT

A rack lubricator is bolted to a drive pinion housing. The lubricator supports a porous felt gear on a rotatable shaft. Lubricant is ported through the shaft to the inner surface of the gear, and the gear wicks the lubricant onto the rack teeth, thereby coating the surface of the rack with minimal lubricant as the felt gear rolls with the rack.

9 Claims, 3 Drawing Figures

RACK LUBRICATOR

BACKGROUND OF THE INVENTION

The invention relates generally to rack lubricating systems, and specifically, to machine assemblies employing exposed racks, where excess lubricant is not permissible.

One area where excess lubricant is not permitted is on machines which may utilize overhead rack assemblies where excess lubricant would tend to drip onto a shop floor; personnel; or a workpiece.

In the aerospace industry and in other industries, parts are being manufactured from composite tape comprised of reinforcing fibers impregnated with a resin. Tape machines have been developed which carry an elevated tape laying head. The tape laying head dispenses composite tape as it makes multiple passes across a mold or work surface. The tape laying machines utilized for making composite structures are located in a "clean room"; that is, a room which is free of dust and other contaminants so that the successive plys of built-up composite material will be free of deleterious matter. In such an environment, it is not permitted to have stray lubricant contaminating the machine locale.

It may be appreciated that a lubricator is required for rack and pinion drives, to prevent break down and galling of the toothed surfaces, especially for machines having high loads or requiring high speed of operation. Tape laying machines generally are lightweight and operate at moderately high speeds.

The requirement of rack lubrication on rack and pinion drives is deemed to be of importance in other industries as well, such as the food and soft drink industries, where food contaminants such as lubricating oil are not permitted.

It is well known in the gear industry to employ mist lubrication for gear drives, but it is necessary to enclose the mist of air and oil to prevent contamination of the environment. Some mist lubrication systems require oil reclassifiers or oil reclamation devices on an enclosed housing.

Similarly, it is well known that many enclosed rack and pinion drives are flooded with liquid lubricant, either statically or by means of an oil pump.

On a gantry type tape laying machine, it is preferable to use a rack and pinion drive to feed the tape head gantry along a slideway, which may extend up to sixty feet, or more. Such a machine utilizes a drive box having a drive pinion carried on the movable gantry and the relatively stationary rack is carried on a machine base either at a low point or a high point, elevated from the floor. Obviously, an oil flood system cannot be employed because of the magnitude of an enclosure and the quantity of oil needed to lubricant the system. Similarly, an oil mist system cannot be utilized because of the danger of airborne oil migrating to a composite surface, which must be free of contaminants.

Applicant has obviated the difficulties inherent in prior art systems for lubricating a rack and pinion drive, by means of a novel rack lubricator which is carried along with the movable drive pinion relative to a stationary rack.

It is therefore an object of the present invention to provide a rack lubricator which will provide a coating of lubricant to a rack surface utilizing a minimum quantity of coating lubricant.

Another object of the present invention is to provide a rack lubricator for use in overhead rack and pinion drive systems which will not contaminate a lower work surface with lubricant.

SUMMARY OF THE INVENTION

The invention is shown embodied in a machine having a relatively stationary rack attached to a first member and a relatively rotatable drive pinion attached to a second relative movable machine member. An improved rack lubricator is carried by the drive box of the second member and is comprised of a housing having a shaft rotatably supported in a bearing in the housing, and the shaft carries a toothed porous pinion of similar size and pitch as the drive pinion is engaged with the toothed rack. A rotary fluid manifold is connected to one end of the shaft and fluid is ducted into the rotating shaft from a nonrotating fluid line, via the fluid manifold. Interdrilling is provided through the rotatable shaft to feed oil or other lubricant to the porous pinion. In the preferred embodiment, the porous pinion is a large felt pinion which serves to wick the lubricant from the shaft to the rack teeth as the pinion traverses the rack with the drive box.

DESCRIPTION OF THE PREFERRED EMBODIMENT

Figure 1:
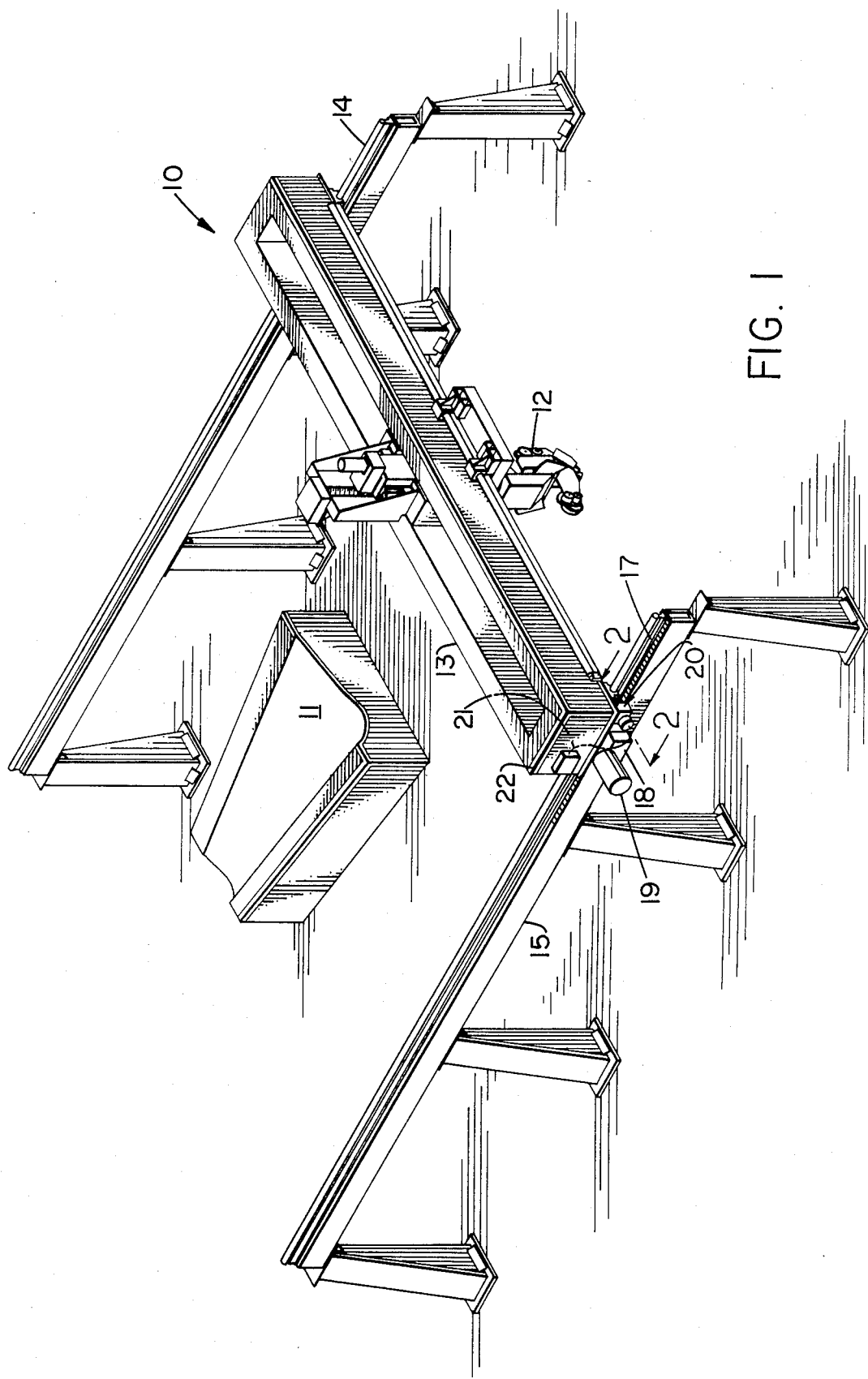
FIG. 1 is a perspective view of a tape laying machine for laying composite material, having a high rail gantry support system with rack and pinion drive.

Referring to the drawings, FIG. 1 is a perspective view of a tape laying machine 10 for laying composite tape on a mold or work surface 11. The tape laying head 12 is carried on an overhead gantry 13 supported on elevated round ways 14 of the machine base 15. The gantry 13 is driven on the base ways 14 by a drive pinion 16 (FIG. 3) in mesh with a relative stationary rack 17 mounted to the elevated machine base 15 alongside the machine way 14. The drive pinion 16 is powered by a drive box 18 and drive motor 19. The drive box 18 has a rack lubricator 20 mounted to one side, so the rack lubricator 20 is carried along with the drive box 18 as it traverses the rack length. The rack lubricator 20 receives fluid from a hose connected to a fluid junction block 22, which may be carried on the gantry 13 or any convenient part movable with the gantry 13 as it traverses the length of the base 15.

Figure 2:
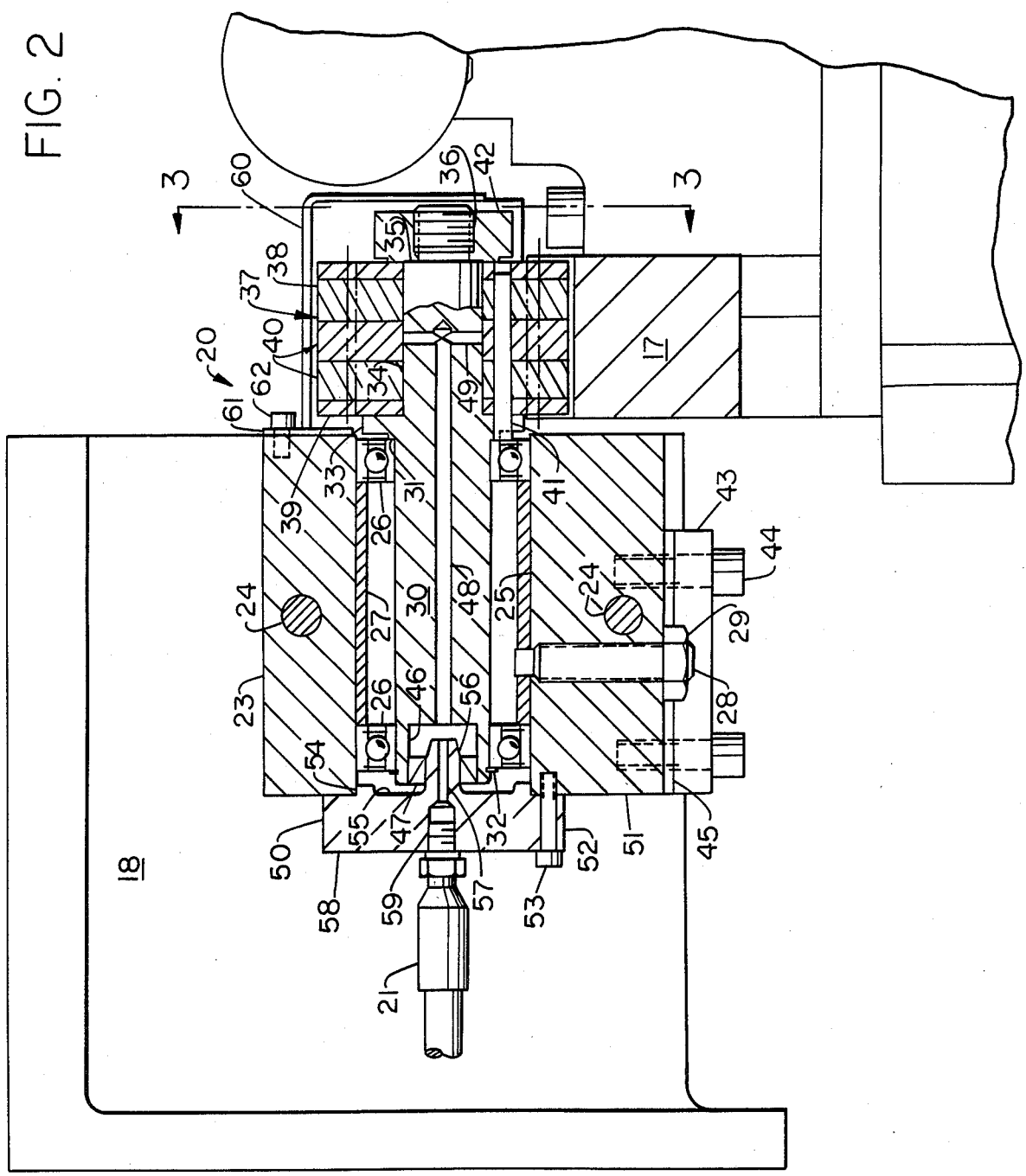
FIG. 2 is a section through the rack lubricator taken along the line 2—2 of FIG. 1.

The section shown in FIG. 2 illustrates that the rack lubricator 20 has a housing 23 which is affixed by a pair of screws 24 to the side of the drive box 18. The housing 23 has a bore 25 extending horizontally through its length, and a pair of bearings 26 are positioned at opposite ends of the bore 25. The bearings 26 are located against a fixed spacer tube 27 carried in the bore 25 and positioned by a dog point set screw 28 extending through the housing 23 and the spacer tube 27. The set screw 28 is held with a lock nut 29. The bearings 26 carry a rotatable shaft 30, axially fixed by a shaft shoulder 31 and a retaining ring 32. The shoulder 31 is machined on the backside of an integral shaft flange 33, and the flange 33 is adjacent to a gear mounting diameter 34 machined on the shaft 30. The gear mounting diameter 34 extends from the flange 33 to a front face 35 which is adjacent to a threaded front end 36 of the shaft 30. The gear diameter 34 of the shaft 30 carries a special gear assembly 37, comprising front and rear metal plates 38,39, and having felt layers 40 sandwiched between the plates 38,39. A pin 41 passes through the gear assembly 37 and extends into the shaft flange 33 to effect a drive couple between the gear assembly 37 and the shaft 30. The pin 41 also locates the relatively soft felt layers 40 radially, and keeps them timed to the rotation of the metal plates 38,39. The gear assembly 37 is axially retained on the shaft 30 by a lock nut 42 received on the threaded end 36 of the shaft 30 and abutting the front gear plate 39. The plates 38,39 and felt layers 40 of the gear assembly 37 have identical profiles and are in mesh with the rack 17 located on the machine base 15. The rack lubricator 20 is positioned by a lower mounting block 43 which spans the rack lubricator 20 and the drive box 18 and is affixed to both 18,20, by screws 44, and a fitting spacer 43 is machined to a thickness which will position the pitch line of the rack lubricator gear assembly 37 approximately 0.010 inch above the pitch line of the rack 17 so the assembly 37 will rotate freely as a the rack lubricator 20 traverses the rack length. The rear end of the shaft 30 has a counter bore 46 which receives a rotary seal 47. A central hole 48 is interdrilled from the counter bore 46 axially to the gear mounting diameter 34 of the shaft 30 where it intersects a crossdrilled hole 49 extending through the diameter 34. A manifold cap 50 is mounted to the rear surface 51 of the rack lubricator housing 23, and has an outer diameter 52 which is bolted to the housing 23 by cap screws 53. A pilot diameter 54 extends into the bearing bore 25 of the housing 23, and the pilot diameter 54 has a face relief 55 terminating at a reduced central pilot diameter which extends from the relief 55 of the cap 50 through the seal 47 of the shaft 30. A central hole 57 is drilled through the cap 50 axially in line with the central hole 48 of the shaft 30. The pilot diameter 54 is tapered slightly at its leading edge to provide smooth entry into the shaft seal 47. The outer face 58 of the manifold cap 50 has a pipe tapped hole 59 which receives the fluid hose 21 depicted in FIG. 1.

As the drive box 8 traverses the machine rack 17, the gear assembly 37 of the rack lubricator 20 will rotate and roll along the rack teeth, and fluid received through the fluid manifold cap 50 will flow through the interdrilled holes 48,49 of the shaft 30 and through the porous gear assembly 37, thereby providing surface lubrication to the teeth of the rack 17. The manifold cap 50 does not rotate, but a leakproof joint is affected between the rotating shaft seal 47 and the nonrotating pilot diameter 54 of the manifold cap 50.

A cover 60 is provided over the gear assembly 37, and the cover 60 is basically boxlike, open at a mounting flange 61 at its inner face and open at the bottom. The flange 61 is secured to the rack lubricator housing 23 by screws 62. The cover 60 serves to prevent flyaway of particles from the rotating gear assembly 37.

Figure 3:
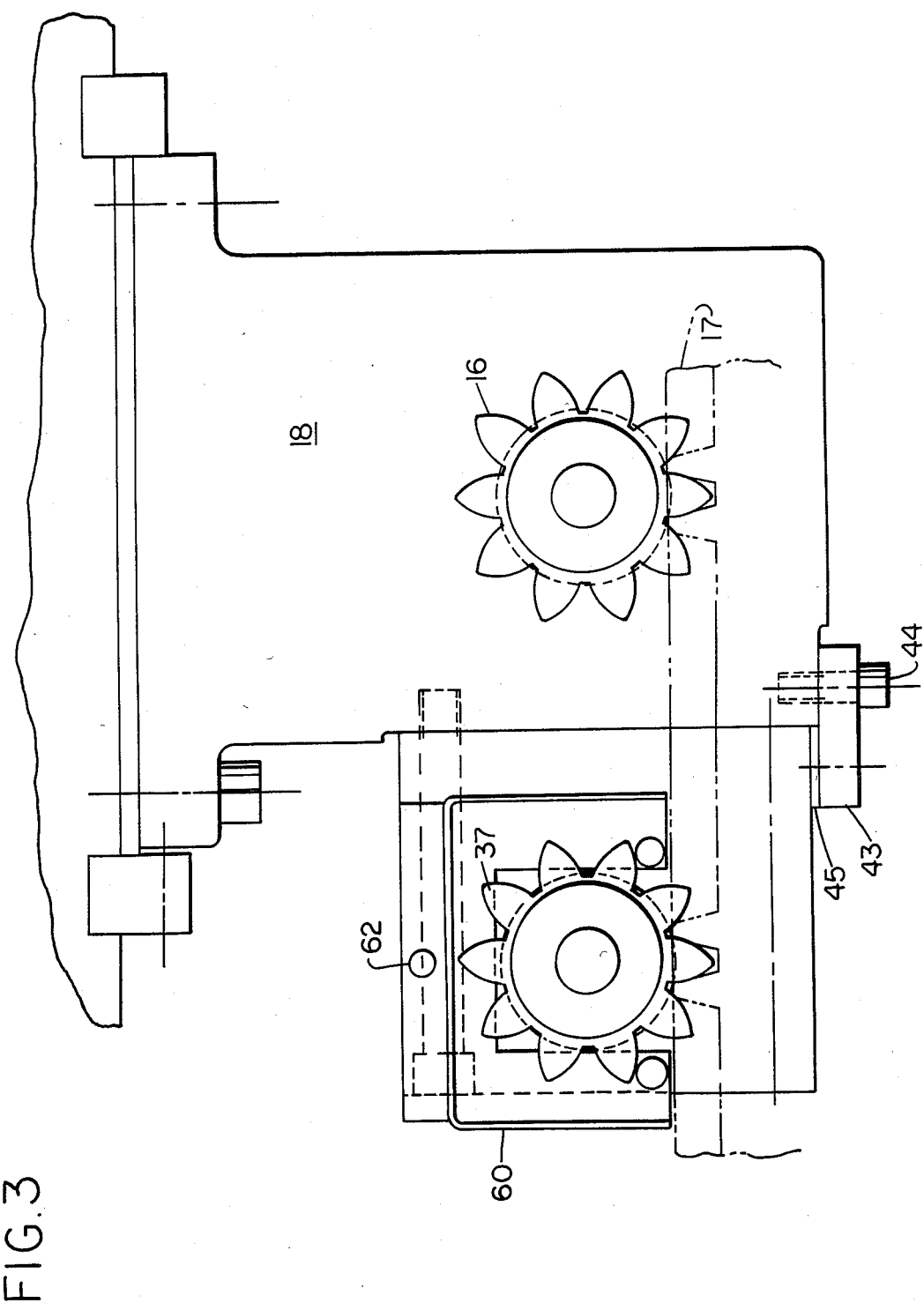
FIG. 3 is an elevational view of the rack lubricator of FIGS. 1 and 2 taken along the line 3—3 of FIG. 2.

The elevational view of FIG. 3 shows the drive box 18 supporting the rack lubricator housing 23, and the cover 60 is mounted to the housing 23. The gear assembly 37 is shown to be of identical size to the drive pinion 16 since they are both on a common centerline relative to the rack 17. However, it may be appreciated by those skilled in the art, that the pinion 16 and gear assembly 37 may be of differing sizes depending on their location relative to the rack teeth. The main requirement is that the pinion 16 and gear assembly 37 have a substantially identical tooth profile, commonly defined by the pitch of a gear. The lower mounting block 43 is shown mounted to the bottom of the drive box 18, and serves to position the rack lubricator housing 23 by the fitting spacer 45 located between the block 43 and housing 23.

The horizontal rack 17 of the machine 10 shown in FIG. 1 may optionally be inverted, with the gear assembly 37 mounted beneath the rack 17. However, it should be understood that a rack applied to the other mechanisms may be mounted in any attitude and the rack lubrication may still be advantageously applied.

While the invention has been shown in connection with a preferred embodiment, it is not intended that the invention be limited to such embodiment, but rather the invention extends to all such designs and modifications as come within the scope of the appended claims.

What is claimed is:

1. In a machine having first and second machine members movable with respect to one another, wherein a toothed rack is affixed to the first member and a mating toothed gear is rotatably carried by the second member in mesh with said rack, an improved rack lubricator, comprising:
   (a) a housing;
   (b) a bearing in said housing;
   (c) a shaft rotatably supported in said bearing;
   (d) a toothed relatively soft porous gear member having a uniform tooth profile, cooperatingly formed to, and engageable with, said toothed rack, said porous gear member rotatably carried by one of said shaft and housing as the other of said shaft and housing is fixed to said second member;
   (e) rotary fluid manifold means for ducting fluid from a non-rotating fluid line to said porous gear member; and
   (f) a toothed relatively firm end plate rotatably carried with, and held adjacent to, said porous gear member, said end plate having the same tooth profile of said gear member.

2. The lubricator of claim 1, wherein said porous gear member is comprised, in part, of a non-metal material.

3. The lubricator of claim 2, wherein said non-metal material comprises a fibrous material.

4. The lubricator of claim 3, wherein said fibrous material comprises felted fibers.

5. In a machine having first and second machine members movable with respect to one another, wherein a toothed rack is affixed to the first member and a mating toothed gear is rotatably carried by the second member in mesh with said rack, an improved rack lubricator, comprising:
   (a) a housing affixed to said second member;
   (b) a bearing in said housing;
   (c) a shaft rotatably supported in said bearing and having a shaft end extending from one side of said housing;
   (d) a toothed relatively soft porous gear member carried on said shaft end, having a uniform tooth profile cooperatingly formed to, and engageable with said toothed rack;
   (e) a fluid port in said shaft, in fluid communication with said porous gear member;
   (f) a rotary fluid manifold carried with said housing and coupled in fluid communication with said fluid port; and
   (g) a toothed relatively firm end plate carried on said shaft end and held adjacent to said porous gear member, said end plate having the same tooth profile of said gear member.

6. The lubricator of claim 5, further comprising a fluid supply source connected to said manifold.

7. The lubricator of claim 5, wherein said porous gear member comprises a main gear body of felted fibers laminated in assembly with an end plate of solid, non-fibrous material, said main gear body and said end plate having the same gear profile.

8. The lubricator of claim 1, further comprising means for positively connecting said one of said shaft and housing, gear member, and plate to one another.

9. The lubricator of claim 5, further comprising means for positively connecting said shaft, gear member, and plate to one another.

* * * * *